July 19, 1955    M. G. LEONARD    2,713,316
CONTROL DEVICE
Filed Aug. 10, 1945
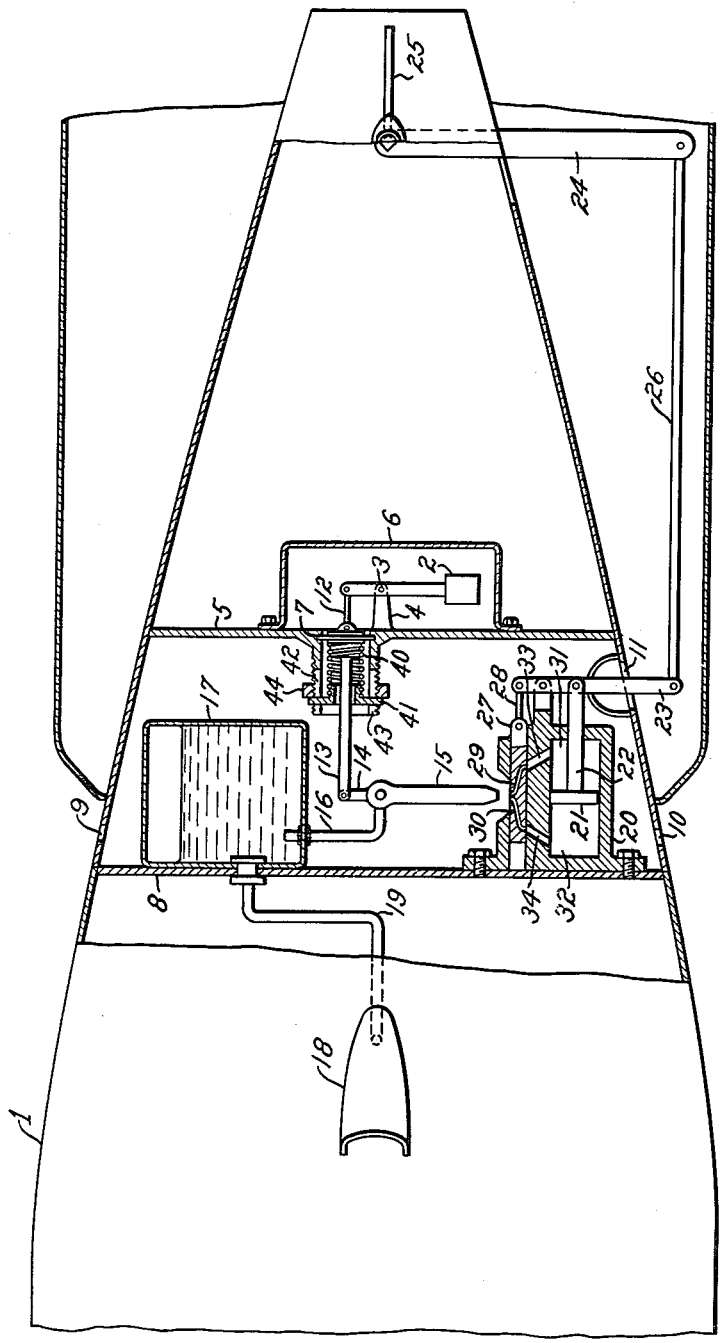
WITNESSES:
Wm. B. Sellers.
INVENTOR
Merrill G. Leonard.
BY
Paul E. Friedemann
ATTORNEY

United States Patent Office 2,713,316
Patented July 19, 1955

2,713,316

CONTROL DEVICE

Merrill G. Leonard, Sharon, Pa., assignor, by mesne assignments, to the United States of America as represented by the Secretary of the Air Force Application August 10, 1945, Serial No. 610,069

1 Claim. (Cl. 114—25)

My invention relates to steering control devices for conveyances moving through a fluid medium and more particularly to depth control means for underwater crafts.

Usually power propelled conveyances moving in a fluid medium have engines or electric motor means, supplied from a generator or a battery, available to actuate the rudders in response to the control of devices having "space rigidity" to cause the craft to move through the medium in a given direction.

In torpedoes, in distinction from self-propelled bombs, the control requirement is usually not as general as stated in the preceding paragraph. Usually a pendulous member, modified in operation by a depth responsive device, suffices to control the actuating means for the elevating rudders to thus keep the torpedo on even keel at a given depth.

In jet propelled torpedoes, no electric batteries nor the electric rudder actuating means are used. It is however, essential that a jet propelled torpedo maintain a given depth of operation.

One broad object of my invention is to utilize the flow of the medium past a conveyance in motion through the medium to actuate the rudders for the craft to control the course of its motion through the medium.

A more specific object of my invention is to utilize the energy of the water flowing past a torpedo in motion through the water to actuate the rudders by means controlled by devices responsive to the depth of the torpedo and the direction of its axis with reference to the horizon.

Another object of my invention is to control the motor means for the rudders of a craft moving through a fluid medium in response to the pressure of the medium and the direction of the movement of the craft with reference to the horizon, wherein the motor means derives power from the flow of the medium past the craft.

The objects hereinbefore recited are merely illustrative. Other objects and advantages will become more apparent from a study of the following specification, and the claim thereto appended, made in conjunction and with reference to the accompanying drawing, in which, the single figure is a somewhat schematic showing of my invention as applied to a jet propelled torpedo.

In the figure, 1 designates the torpedo housing. At a siutable place within the housing 1, I pivotally mount the pendulum 2 on the pivot 3 disposed on a bracket 4 secured to the bulkhead 5. The pedulum is disposed in the chamber 6 the pendulum thus being sealed off from the sea by the chamber 6, the bulkhead 5 and the flexible diaphragm 7 disposed in the opening shown in the bulkhead 5.

The region between the bulkhead 5 and the bulkhead 8 is open to the sea by reason of the openings 9, 10 and 11. From this construction, it will be apparent that the space within chamber 6, while sealed off against the sea is nevertheless subject to the sea water pressure, that is, the hydrostatic head above chamber 6. The diaphragm 7 thus moves as a function of pressure.

The upper end of the pendulum, the portion projecting above the pivot 3 is, by means of a link 12 and a projection on the diaphragm 7, connected to the aft surface of the diaphragm. Since the pendulum, taken alone, moves the link 12, and thus the diaphragm 7, as a function of the position of the longitudinal axis of the torpedo with reference to the horizon, and since the diaphragm, taken alone, is moved as a function of pressure, it is apparent that link 13 will move longitudinally of itself as a function of both depth and the inclination of the torpedo axis with reference to the horizon.

Since it is often desirable that the depth of operation of the torpedo be made adjustable, the diaphragm 7 is at its forward face secured to the biasing spring 40. This spring has its forward end secured to the longitudinally adjustable member 41. This member has projections to fit in the slits 42 of the threaded tubular bracket 43. By changing the position of the nut 44 on the tubular bracket 43 the tension of the spring 40 is adjusted. Since this adjustment varies the effect of the hydrostatic head on the diaphragm, it is apparent that the depth of operation of the torpedo can be adjusted at will.

The forward end of link 13 is connected to the operating arm 14 of the pivotally mounted jet pipe 15. The jet pipe 15 is pivotally mounted on conduit 16 and is also hydraulically coupled to this conduit 16 so that sea water flowing downwardly through conduit 16 is expelled at the lower end of the jet pipe 15.

The conduit 16 is operatively connected to the closed chamber 17 mounted on the bulkhead 8. I dispose a scoop 18 at a suitable place on the outside of the torpedo so as to scoop up sea water. The pressure region of the scoop I connect to the interior of the chamber 17 by the conduit 19 disposed in the torpedo.

When the torpedo is fired, chamber 17 is preferably empty, but as soon as the torpedo moves through the water, which motion is at considerable speed, water is driven into the chamber and the air trapped in the chamber is compressed. The liquid thus collecting in the chamber 17 is driven out through conduit 16 and is thus expelled at the nozzle of the jet pipe with considerable kinetic energy.

Mounted directly below the jet pipe are the elevating rudder actuating means. These means comprise a closed cylinder 20, housing a double acting piston 21. The connecting rod 22, through suitable packing, is connected to the lever 23 pivoted in a suitable bracket on the cylinder 20. The lever is operatively coupled to the crank-arm 24 of the elevating rudders 25 by the link 26.

The lever 23 has an end projecting above the pivot for the lever. This upper end is operatively connected to the slide valve 27 by a suitable link 28. The slide valve is provided with the two conduits 29 and 30 constructed as shown and arranged to communicate respectively with the opposite ends 31 and 32 of the cylinder, through conduits 33 and 34.

Let the assumption be that the torpedo is at the correct depth but its motion is in the sounding direction. In this case, the pedulum moves the link 13 in the aft direction with the result that the jet pipe is moved forward. The forward end 32 of the cylinder is thus through conduits 30 and 34 filled with water whereas the water in the aft end 31 is permitted to escape through conduits 33 and 29. The piston 21 is thus moved aft to actuate the rudders 25 counterclockwise to thus effect the horizontal positioning of the torpedo axis.

The actuation of the lever 23 also moves the slide valve 27 to follow the movement of the lower end of the jet pipe. The pressures in the cylinder ends are thus effectively balanced. This apparatus thus provides for effective angular movement of the elevating rudders as a function of the angular movement of the jet pipe.

If the torpedo is too deep and moving in the sounding direction, the angular movement of the jet pipe is proportional to the combined effect of the pressure and angle of sounding. If the torpedo is too deep but horizontal, the pressure effect alone actuates the jet pipe. If the torpedo is too deep but is already moving upwardly then the motion of the jet pipe is a function of the differential effect of the pendulum and the pressure. My apparatus thus effectively controls the rudders 25 for any combinations of pressure and pendulum action.

While I have shown but one embodiment of my invention, I do not wish to be limited to the particular showing made but wish to be limited only by the scope of the claim hereto appended.

I claim as my invention:

In apparatus for controlling the angular position of the elevating rudders of a torpedo with reference to the longitudinal axis of the torpedo, in combination, a scoop projecting from the body of the torpedo for scooping up sea water as the torpedo moves, at a relatively high speed, through the sea, a pivotally mounted jet tube, conduit means connecting the jet tube to the pressure region of the scoop whereby sea water will be expelled from the nozzle end of the jet tube, hydraulic engine means mounted in the torpedo and comprising, a cylinder having conduits at each end, a balanced piston in the cylinder, a slide valve having two conduits having one pair of corresponding ends normally terminating under the nozzle end of the jet tube and the other corresponding ends normally disposed in communication with the conduits in the cylinder ends, whereby liquid of equal pressure is normally supplied to the cylinder heads at each side of the piston to thus hold the piston in a balanced position, a piston rod, coupling means between the piston rod and the rudders to actuate the rudders, coupling means between the piston rod and the slide valve to move the valve as a function of the piston movement to follow any movement of the pivoted, jet tube, and means for moving the jet tube as a function of depth of the torpedo and direction of its axis with reference to the horizontal.

References Cited in the file of this patent

UNITED STATES PATENTS

| | | |
|---|---|---|
| 825,881 | Gibon | July 10, 1906 |
| 933,083 | Leavitt | Sept. 7, 1909 |
| 1,389,190 | Flint | Aug. 30, 1921 |
| 2,104,627 | Van Manteuffel | Jan. 4, 1938 |
| 2,176,807 | Wunsch | Oct. 17, 1939 |
| 2,392,443 | Youngman | Jan. 8, 1946 |